(12) United States Patent
Bomal et al.

(10) Patent No.: US 8,334,334 B2
(45) Date of Patent: Dec. 18, 2012

(54) USE OF SPECIFIC SILICAS FOR INCREASING THE RIGIDITY OF A THERMOPLASTIC WHILE MAINTAINING OR IMPROVING ITS IMPACT RESISTANCE

(75) Inventors: Yves Bomal, Levallois Perret (FR); Antoine Guiu, Paris (FR)

(73) Assignee: Rhodia Chimie, Aubervilliers (FR)

( * ) Notice: Subject to any disclaimer, the term of this patent is extended or adjusted under 35 U.S.C. 154(b) by 389 days.

(21) Appl. No.: 11/794,295

(22) PCT Filed: Dec. 27, 2005

(86) PCT No.: PCT/FR2005/003289
§ 371 (c)(1),
(2), (4) Date: Oct. 16, 2007

(87) PCT Pub. No.: WO2006/072704
PCT Pub. Date: Jul. 13, 2006

(65) Prior Publication Data
US 2009/0326139 A1    Dec. 31, 2009

(30) Foreign Application Priority Data

Dec. 30, 2004 (FR) .................................... 04 14097

(51) Int. Cl.
*C08K 3/34* (2006.01)
*C08K 3/36* (2006.01)
*B60C 1/00* (2006.01)

(52) U.S. Cl. ........ 524/493; 524/521; 524/526; 524/575; 423/339; 423/335; 428/402

(58) Field of Classification Search .................. 524/493, 524/521, 526, 575; 423/339, 335; 428/402
See application file for complete search history.

(56) References Cited

U.S. PATENT DOCUMENTS

| 3,235,331 A | 2/1966 | Nauroth et al. |
| 3,857,925 A | 12/1974 | Sirianni et al. |
| 6,107,226 A | 8/2000 | Chevallier |
| 6,180,076 B1 | 1/2001 | Uhrlandt et al. |
| 6,290,924 B1 * | 9/2001 | Chevallier ...................... 423/335 |
| 6,391,977 B1 * | 5/2002 | Yu et al. .......................... 525/240 |
| 6,468,493 B1 | 10/2002 | Chevallier et al. |
| 2003/0003040 A1 | 1/2003 | Lindner et al. |
| 2005/0032965 A1 * | 2/2005 | Valero ........................... 524/493 |

FOREIGN PATENT DOCUMENTS

| DE | 1 467 019 | 1/1969 |
| EP | 0 396 450 A1 | 11/1990 |
| EP | 0 901 986 A1 | 3/1999 |
| EP | 1 241 136 A2 | 9/2002 |
| FR | 2 763 581 A1 | 11/1998 |
| WO | WO 01/07364 A1 | 2/2001 |
| WO | WO 03/016215 A1 | 2/2003 |

OTHER PUBLICATIONS

International Search Report for PCT/FR 2005/003289 (in English).

* cited by examiner

*Primary Examiner* — James J Seidleck
*Assistant Examiner* — Deve E Valdez
(74) *Attorney, Agent, or Firm* — SNR Denton US LLP

(57) ABSTRACT

The invention relates to the use of a silica having a BET specific surface of at least 60 $m^2/g$ for increasing the rigidity of a thermoplastic polymeric material while maintaining i.e. improving its impact resistance. The silica used is of the type obtained according to a method involving the drying of a silica suspension obtained by reacting a silicate with an acidulant according to the following successive steps: (i) forming an aqueous starter having a pH between 2 and 5; (ii) simultaneously adding silicate and the acidulant while keeping the pH between 2 and 5; (iii) continuing with only the addition of silicate until a pH between 7 and 10 has been reached; (iv) simultaneously adding silicate and acidulant while keeping the pH of the reaction medium between 7 and 10, and; (v) continuing with only the addition of the acidulant until a pH value lower than 6 has been obtained. The invention also relates to the materials obtained within this scope.

45 Claims, No Drawings

USE OF SPECIFIC SILICAS FOR INCREASING THE RIGIDITY OF A THERMOPLASTIC WHILE MAINTAINING OR IMPROVING ITS IMPACT RESISTANCE

The present invention relates to the reinforcing of thermoplastic polymeric materials, and concerns more specifically the stiffening of thermoplastic polymeric materials, and especially that of polyolefin-based materials such as polypropylene.

The rigidity of a thermoplastic polymeric composition can be measured especially by its flexural modulus, which reflects the pressure which it is necessary to apply to the material in order to deform it. By "flexural modulus" there is meant more specifically, as used in the present invention, Young's flexural modulus of the material. For a given thermoplastic polymeric material, the flexural modulus may especially be measured according to the method of Standard ISO 178, which consists in providing a sample consisting of the material to be tested, supporting it on two supports separated by a given distance, and applying a constant deformation velocity to the centre of the sample, while continually measuring the load applied to the sample, in order to deduce therefrom the stress according to the displacement.

It often proves desirable to improve the rigidity of the polymeric materials used for the constitution of materials, especially when thin parts having good mechanical properties are sought. Stiffening of this type often proves necessary especially for polyolefin-based materials such as polypropylene, which generally have a relatively low flexural modulus in the raw state.

Generally, it is known that, in order to rigidify thermoplastic polymeric materials, inorganic, natural or synthetic fillers may be incorporated therein. However, although the addition of such inorganic fillers certainly has a positive impact on rigidity it usually induces in exchange a reduction in the impact resistance of the material.

As employed in the present description, the term "impact resistance" (or "impact strength") of a polymeric material designates the greater or lesser aptitude which the polymeric material exhibits for resisting breakage under the effect of an impact, especially under the effect of an impact at high speed. The impact resistance of a polymer can especially be measured by the method termed "impact test". This type of test generally consists in cutting a sample consisting of the material to be tested (U-shaped or, more often, V-shaped cut), then in smashing this cut sample under the impact of a weight (pendulum or hammer), and in measuring the energy absorbed by the breaking of the sample; this reflects the breakage resistance energy (or "resilience") of the material. The more energy that is absorbed, the greater the impact resistance of the material. Within this scope, the impact resistance of a polymeric material can be determined especially by using the so-called "Charpy impact test" method, for example according to the specific method of Standard ISO 179.

In the more general case, the reduction in the impact resistance which is observed when inorganic fillers are introduced into a thermoplastic polymeric material results, in concrete terms, in the embrittlement of the material at the same time as the rigidity is increased.

In order to avoid such embrittlement, a first solution which has been proposed consists in modifying the polymer, for example by adding to it an elastomeric resin, as proposed in U.S. Pat. No. 4,209,504, or else other specific polymers, such as those considered for example in U.S. Pat. No. 5,525,703 or U.S. Pat. No. 5,041,491.

Another solution provided for this purpose consists in treating the inorganic filler used by means of organic compounds such as fatty acids. Thus, it is known especially from *Polymer*, vol. 44, pp. 261-275 (2003) to use calcium carbonates treated with stearic acid. More generally, reference may also be made to application WO 00/49081.

It is an aim of the present invention to provide inorganic fillers which make it possible to improve the rigidity of the material, but without a negative effect on its impact resistance. Thus, the invention aims especially to provide inorganic fillers capable of guaranteeing such an effect without having to modify the composition of the polymer by adding the specific polymeric fillers of the aforesaid type, nor to use inorganic fillers treated with compounds of the fatty acid type.

To this end, a subject of the present invention is the use of particular silicas, having especially a BET specific surface area of at least 60 $m^2/g$, as an inorganic filler in a thermoplastic polymeric material for increasing the rigidity of said material, while maintaining or improving its impact resistance.

More specifically, the inventors have now demonstrated that the specific silicas of the type described in application WO 03/016215 provide such an effect in thermoplastic polymeric materials when they have a BET specific surface area of at least 60 $m^2$ g. As used in the present description, the "BET specific surface area" is to be understood as the specific surface area of the silica as determined according to the method of BRUNAUER-EMMET-TELLER described in *The Journal of the American Chemical Society*, volume 60, page 309, February 1938, and corresponding to International Standard ISO 5794/1 (annex D).

Thus, against all expectations, the inventors have now discovered that, when silicas of the type described in application WO 03/016215 and having a BET specific surface area of at least 60 $m^2/g$ are dispersed in a thermoplastic polymeric material, an increase in the rigidity of the material is observed, which is not accompanied by an associated reduction in the impact resistance of the material. This result is highly surprising, insofar as it is known that the incorporation of an inorganic filler in a polymeric material tends, as a general rule, to reduce the impact resistance, especially when the inorganic filler is not pretreated with a fatty acid type of agent.

Even more unexpectedly, it has been found that by using silicas of the type described in application WO 03/016215 and having a BET specific surface area of at least 60 $m^2/g$, in certain cases an increase in the impact resistance of the material may even be observed, for example when the silica is finely dispersed in the material. In other words, in this case an increase in both the impact resistance and the rigidity of the material is obtained. The possibility of such a combined improvement of these two parameters by the employment of a single filler in the polymer is highly surprising. In fact, usually, when a filler is introduced into a polymeric material, a selective improvement either in the impact resistance or in the rigidity of the material is observed, and the improvement of one of these properties generally occurs to the detriment of the other, thus usually making it necessary to use a mixture of fillers of different kinds when it is wished to obtain an increase in the properties of rigidity and of impact resistance at the same time.

Moreover, the work carried out by the inventors has shown that in addition to the aforesaid advantages, the incorporation of a silica of the type described in application WO 03/016215, and having a specific surface area of at least 60 $m^2/g$, into a thermoplastic polymeric material leads, in the majority of cases, to an unexpected improvement in other mechanical characteristics of the material.

Especially, the incorporation of such silicas, generally increases the tensile elongation characteristics of the material (especially the tensile elongation at break of the material, as measured for example according to standard ISO 527), which may prove advantageous, especially when the material is to be subjected to severe bending, for example when it is used in injected parts of complex shape, or when it is intended to act as a hinge between two parts.

Moreover, it has been found that the incorporation of a silica of the type described in application WO 03/016215 into a thermoplastic polymeric material usually induces an increase in the scratch resistance of the material.

The silicas which are used within the scope of the present invention are preferably silicas such as those described in WO 03/016215, and which specifically have a BET specific surface area of at least 60 $m^2/g$. Alternatively, they may be similar silicas, having similar properties and having a BET specific surface area of at least 60 $m^2/g$. More specifically, the silicas which can be used according to the invention will be described in detail in the following description.

According to a first particularly advantageous embodiment, the silica used according to the invention is a silica, termed hereinafter "silica S", which has a BET specific surface area of at least 60 $m^2/g$ and which is obtained (or more generally which is obtainable) according to a method (designated by "method P" in the continuation of the description) which comprises the reaction of a silicate with an acidifying agent, thereby obtaining a silica suspension, then the separation and drying of the suspension, and wherein the reaction of the silicate with the acidifying agent is carried out according to the following consecutive steps:

(i) an aqueous starter, having a pH of between 2 and 5, preferably a pH of at least 2.5, is formed;
(ii) silicate and acidifying agent are added, simultaneously, to said starter in such a way that the pH of the reaction medium is kept between 2 and 5,
(iii) the addition of the acidifying agent is stopped while continuing the addition of silicate to the reaction medium, until a pH value of the reaction medium of between 7 and 10 is obtained,
(iv) silicate and acidifying agent are added, simultaneously, to the reaction medium in such a way that the pH of the reaction medium is kept between 7 and 10,
(v) the addition of the silicate is stopped while continuing the addition of the acidifying agent to the reaction medium, until a pH value of the reaction medium of less than 6 is obtained.

Preferably, the silica S used according to this first embodiment is a silica directly obtained by the method P as defined above. Taking into account its particular steps, especially the first simultaneous addition of acidifying agent and silicate in an acid medium of step (ii) and the second simultaneous addition of acidifying agent and silicate in a basic medium of step (iii), the method P actually imparts specific features and properties to the silica obtained. Alternatively, the silica S may be a silica prepared by another method but having characteristics similar to those of the silicas obtained according to the method P. In general, the silica S is rather a silica of the precipitated type.

In the aforesaid method P, it is possible to use, as silicate, any common form of silicate, for example a metasilicate and/or a disilicate. Advantageously, the silicate employed is an alkali metal silicate, such as sodium silicate or potassium silicate. Preferably, it is a sodium silicate, which advantageously has an $SiO_2/Na_2O$ ratio by weight of between 2.5 and 4, for example between 3.2 and 3.8 (typically between 3.4 and 3.7, for example between 3.5 and 3.6).

Whatever its nature, the silicate is typically employed in the form of a solution, generally an aqueous solution, having a concentration (expressed in $SiO_2$) of between 40 and 330 g/L, typically between 60 and 300 g/L, especially between 60 and 260 g/L (for example of the order of 200 to 250 g/L, especially of the order of 230 g/L, especially when a sodium silicate is employed).

Moreover, the acidifying agent used in the method P is in general a strong inorganic acid such as sulphuric acid, hydrochloric acid or nitric acid, or, alternatively, an organic acid such as acetic acid, formic acid or carbonic acid, for example. Whatever its nature, the acidifying agent may be used in the diluted or concentrated state. It may for example be used in the form of a solution, generally an aqueous solution, having a normality for example of between 0.4 and 36 N, especially between 0.6 and 1.5 N.

According to an advantageous embodiment, the acidifying agent used in the method P is sulphuric acid. In this case, it is preferably employed in the form of a solution, generally an aqueous solution, having a concentration of between 40 and 180 g/L, for example between 60 and 130 g/L (typically of the order of 80 g/L).

Preferably, in the method P, sulphuric acid is used as acidifying agent, and sodium silicate as silicate.

In the method P, whatever the nature of the acidifying agent and of the silicate, the reaction between these compounds is carried out in a very specific manner according to the following steps.

First of all, in step (i), an aqueous starter having a pH of between 2 and 5 is formed. Preferably, the starter has a pH of between 2.5 and 5, especially between 3 and 4.5. The pH is for example between 3.5 and 4.5, and is typically of the order of 4.

The initial starter of step (i) may be obtained by adding acidifying agent to water so as to obtain a pH value of the starter of between 2 and 5, preferably between 2.5 and 5, especially between 3 and 4.5 and, for example, between 3.5 and 4.5.

According to another embodiment, the initial starter of step (i) may be obtained by adding acidifying agent to a water/silicate mixture so as to obtain this pH value.

The starter may also be prepared by adding acidifying agent to a starter containing silica particles previously formed at a pH of less than 7, so as to obtain a pH value of between 2 and 5, preferably between 2.5 and 5, especially between 3 and 4.5, and for example between 3.5 and 4.5 (typically, the pH is of the order of 4).

Moreover, the starter formed in step (i) may optionally comprise an electrolyte. Nevertheless, preferably, no electrolyte is added to the starter in step (i). More generally, it is preferable not to add any electrolyte to the medium during the method P.

As used in the present description, the term "electrolyte" is to be understood in its usual meaning, i.e. as designating any ionic or molecular substance which, when it is in solution, is decomposed or breaks down to form ions or charged particles. As an example of the electrolyte which may be present in the starter, a salt of the group of alkali metal and alkaline earth salts may be especially cited, for example the metal salt of the silicate used and of the acidifying agent, e.g. sodium sulphate in the case of the reaction of a sodium silicate with sulphuric acid, or sodium chloride in the case of the reaction of a sodium silicate with hydrochloric acid.

In step (ii) of the method P, acidifying agent and silicate are added simultaneously (i.e. jointly and generally gradually).

This simultaneous addition is carried out in such a way that the pH of the reaction medium is kept between 2 and 5, preferably between 2.5 and 5, especially between 3 and 4.5, for example between 3.5 and 4.5, during the addition. Maintaining the pH within the indicated ranges may be obtained especially by controlling the respective rates of introduction of acidifying agent and silicate. Typically, for this purpose, the silicate is introduced at a constant flow rate (in general between 150 and 250 L/hr, for example of the order of 180 to 200 L/hr), and the acidifying agent is introduced jointly at a variable rate of flow, which is controlled in order to keep the pH at the desired value.

The simultaneous addition of step (ii) is advantageously carried out in such a way that the pH value of the reaction medium is always equal (to within ±0.2 unit, and preferably to within ±0.1 unit) to a pH value of between 3 and 4.5, in general the pH value reached at the end of step (i) (typically, the pH is kept at a value of 4 to within ±0.2 unit, and preferably within ±0.1 unit).

In the subsequent step (iii), the addition of acidifying agent is stopped, while the addition of silicate to the reaction medium is continued. The result is therefore an increase in the pH of the medium, which is utilised to reach a pH value of the reaction medium of between 7 and 10, preferably between 7.5 and 9.5, for example between 7.5 and 8.5. Typically, the pH reached at the end of step (iii) is of the order of 8.

Between step (iii) and the subsequent step (iv), i.e. just after the addition of silicate has been stopped and before the second simultaneous addition, development of the reaction medium may optionally be carried out. In this case, development is advantageously carried out by allowing the medium to mature at the pH obtained at the end of step (iii), generally while agitating. Such development is typically carried out for a duration of the order of 2 to 45 minutes, for example between 5 and 25 minutes. Preferably, the development does not include either the addition of acidifying agent or the addition of silicate. More generally, no compound is added usually to the medium during such development.

According to a particular embodiment, acidifying agent may be added to the reaction medium between step (iii) and step (iv), for example between the aforesaid development (when it takes place) and step (iv), or immediately after the addition of silicate of step (iii) has been stopped. In this case, the pH of the reaction medium at the end of this addition of acidifying agent remains however between 7 and 9.5, preferably between 7.5 and 9.5.

After step (iii) and any development and/or addition of acidifying agent mentioned previously, in step (iv) a further simultaneous addition of acidifying agent and silicate is carried out, in such a way that the pH of the reaction medium is kept between 7 and 10, preferably between 7.5 and 9.5, for example between 7.5 and 8.5. Here again, the pH is generally kept within the ranges indicated by controlling the respective rates of introduction of acidifying agent and silicate, typically by introducing the silicate at a constant flow rate (in general between 150 and 250 L/hr, for example of the order of 180 to 200 L/hr), and by jointly introducing the acidifying agent at a variable flow rate, controlled in order to keep the pH at the desired value.

The simultaneous addition of step (iii) is advantageously carried out in such a way that the pH value of the reaction medium is always equal (to within ±0.2 unit, and preferably to within ±0.1 unit) to a pH value of between 7 and 10, preferably between 7.5 and 9.5, for example between 7.5 and 8.5, in general to the pH value reached at the end of the preceding step (typically, in step (iv), the pH is kept at a value of 8 to within ±0.2 unit, and preferably within ±0.1 unit).

Finally, in step (v), the addition of the silicate is stopped, while continuing the addition of acidifying agent to the reaction medium in such a way as to obtain a pH value of the reaction medium of less than 6, preferably between 3 and 5.5, especially between 5 and 5.5, for example of the order of 5.2.

After this step (v), i.e. just after the addition of acidifying agent has been stopped, it may be advantageous to carry out development of the reaction medium. In this case, development is advantageously performed by allowing the medium to mature at the pH obtained at the end of step (v), in general while agitating. Development is typically performed for 2 to 45 minutes, for example between 5 and 25 minutes. Preferably, it includes the addition of neither acidifying agent nor silicate. More generally, usually no compound is added to the medium during such development.

The reaction vessel in which the whole of the reaction of the silicate with the acidifying agent is performed is customarily equipped with suitable agitating equipment and heating equipment.

The whole of the reaction of the silicate with the acidifying agent is generally performed at between 70 and 95° C., especially between 75 and 90° C.

According to a variant of the invention, the whole of the reaction of the silicate with the acidifying agent is carried out at a constant temperature, customarily between 70 and 95° C., especially between 75 and 90° C., typically between 80 and 90° C.

According to another variant, the temperature at the end of the reaction is higher than the temperature at the start of the reaction. According to this variant, the temperature is preferably kept at between 70 and 85° C. at the start of the reaction (for example during steps (i) to (iii) and during the optional subsequent development), then the temperature is increased, preferably to a value between 85 and 95° C., at which it is kept until the end of the reaction (for example during steps (iv) and (v) and the optional subsequent development).

In the method P, at the end of the steps which have just been described, a silica suspension is obtained. The silica suspension is then subjected to separation, in general of the liquid/solid type. Separation customarily comprises filtration, which is optionally followed by washing, if necessary, for example with water, making it possible especially to eliminate unreacted silicates, acidifying agent, and/or at least part of the salts formed. The aforesaid filtration is carried out according to any suitable method, for example by means of a filter press, a belt filter or a vacuum filter.

At the end of this separation, a pulp of silica is recovered, i.e. an aqueous medium richer in silica and lower in water (filter cake, in the case where separation is by filtration).

The concentrated silica pulp thus obtained is then dried.

Preferably, drying is carried out by spraying. For this purpose, any suitable type of sprayer may be used, especially a turbine, nozzle, liquid-pressure or two-fluid sprayer. In general, when filtration is carried out by means of a filter press, a nozzle sprayer is used, and when filtration is carried out by means of a vacuum filter, a turbine sprayer is used.

It should be noted that the filter cake-type concentrated silica pulp is not always in a state enabling it to be sprayed, especially taking into account its generally high viscosity. In a manner known per se, the cake is then subjected to a cleavage operation prior to spray drying. The cleavage operation may be carried out mechanically, by passing the cake into a colloidal or ball type crusher. Cleavage is generally carried out in the presence of an aluminium compound, especially sodium aluminate, and, optionally, in the presence of an acidifying agent such as described previously (in the latter case the aluminium compound and the acidifying agent are generally added simultaneously). The cleavage operation makes it possible especially to reduce the viscosity of the suspension to be subsequently dried.

When drying is carried out by means of a nozzle sprayer, the silica obtained after drying is customarily in the form of substantially spherical balls. When drying is completed, a crushing step may optionally be carried out on the product recovered, in order to obtain the silica in the form of a powder.

When drying is carried out by means of a turbine sprayer, the silica obtained is usually in the form of a powder.

The silica obtained in powder form, as obtained for example after drying by means of a nozzle sprayer and crushing, or as obtained after drying by means of a turbine sprayer, may optionally be subjected to a further agglomeration step, for example by direct compression, moist granulation (i.e. with the use of a binder such as water, silica suspension . . . ), extrusion or, preferably, dry compaction. When this latter technique is employed, it may prove opportune, before proceeding with compaction, to deaerate (an operation also known as pre-densification, or degassing) the pulverulent products so as to eliminate the air included therein and ensure more even compaction. The silica obtained by means of this agglomeration step is generally in the form of granules.

Thus, the silica S obtainable according to the method P may be in the form of powder, or balls or compacted granulates.

Advantageously, the silica S used according to the invention is in powder form; preferably the aforesaid powders, obtained by drying by means of a nozzle sprayer and crushing, or obtained after drying by means of a turbine sprayer. Alternatively, the powder may also come from the crushing of the compacted silica granulates described above.

Alternatively, the silica S used according to the invention may be in the form of substantially spherical balls, obtainable by the aforesaid drying by means of a nozzle sprayer.

According to a particularly advantageous variant, the method P for preparation of the silica S comprises (and for example consists of) the following consecutive steps:

(i) an aqueous starter having a pH of between 3 and 4.5, preferably between 3.5 and 4.5 (typically of the order of 4), is formed;

(ii) silicate and acidifying agent are added simultaneously to said starter in such a way that the pH of the reaction medium is kept at the value reached at the end of step (i) to within ±0.2 unit, and preferably to within ±0.1 unit;

(iii) after having optionally allowed the medium to mature, the addition of the acidifying agent is stopped while continuing the addition of silicate to the reaction medium until a pH value of the reaction medium of between 7 and 9.5, preferably between 7.5 and 9.5 (typically of the order of 8), is obtained;

(iv) silicate and acidifying agent are added simultaneously to the reaction medium in such a way that the pH of the reaction medium is kept at the value reached at the end of step (iii) to within ±0.2 unit, and preferably to within ±0.1 unit;

(v) the addition of the silicate is stopped while continuing the addition of the acidifying agent to the reaction medium until a pH value of the reaction medium of between 3 and 5.5, preferably between 5 and 5.5 (typically of the order of 5.2), is obtained;

(vi) the medium is allowed to mature, preferably while agitating, typically for 2 to 20 minutes, for example for 5 minutes;

(vii) the silica suspension obtained at the end of step (vi) is filtered, thereby obtaining a filter cake;

(viii) the filter cake is mechanically cleaved in the presence of sodium aluminate;

(ix) the cleaved cake obtained is dried, and the dried silica obtained is optionally crushed.

According to this specific variant of the method P, the steps (i) to (vi) are advantageously performed at a temperature of between 75 and 95° C., preferably between 80 and 90° C. (at a temperature of the order of 80° C. or 86° C., for example).

Moreover, the silicate used according to this specific variant is advantageously a sodium silicate, advantageously having an $SiO_2/Na_2O$ ratio by weight of between 3.2 and 3.8, typically between 3.5 and 3.6, for example of the order of 3.52. The silicate is preferably employed in the form of a solution having a concentration (expressed as $SiO_2$) of between 200 and 250 g/L, typically of the order of 230 g/L. This solution is generally introduced at a constant flow rate of between 150 and 250 L/hr, for example between 180 and 200 L/hr, typically of the order of 190 L/hr in steps (iii) and (v).

The acidifying agent, for its part, is preferably sulphuric acid, advantageously in the form of a solution having a concentration of between 60 and 130 g/L, for example between 70 and 100 g/L, typically of the order of 80 g/L.

According to a second advantageous embodiment of the invention, the silica used is a silica, termed "silica S1", which has the following characteristics:

a BET specific surface area of between 60 and 550 $m^2/g$;
a CTAB specific surface area of between 40 and 525 $m^2/g$;
an object size distribution width Ld measured by XDC granulometry after ultrasonic deagglomeration of at least 0.91; and
a pore volume distribution such that the ratio $V_{(d5-d50)}/V_{d5-d100)}$ is at least 0.66.

The silica S1 is advantageously a precipitated silica. According to a particular embodiment, it is a silica obtained by the method P defined previously in the present description.

The "CTAB specific surface area", referred to here as in the rest of the present description, designates the external surface area as determined according to Standard NF T 45007 (November 1987) (5.12).

Moreover, the "XDC granulometric analysis method" referred to in the present description is a method of centrifugal sedimentation granulometric analysis by means of which it is possible to measure, on the one hand, the object size distribution widths of a silica and, on the other hand, the XDC mode illustrating its object size. This method is described below:

Equipment Required

BI-XDC (BROOKHAVEN-INSTRUMENT X DISC CENTRIFUGE) centrifugal sedimentation granulometer marketed by the Brookhaven Instrument Corporation
tall 50 ml beaker
50 ml graduated cylinder
BRANSON 1500 watt ultrasonic probe, without endpiece, of 13 mm diameter,
ion-exchanged water
crystalliser filled with ice
magnetic agitator Measurement Conditions DOS 1.35 version of the software (supplied by the granulometer constructor)
fixed mode
rotation speed
duration of analysis: 120 minutes
density (silica): 2.1
volume of the suspension to be sampled: 15 ml Preparation of the Sample Add to the tall beaker 3.2 g of silica and 40 ml of ion-exchanged water.
Place the beaker containing the suspension into the crystalliser filled with ice.
Plunge the ultrasonic probe into the beaker.

Deagglomerate the suspension for 16 minutes by means of the 1500 watt BRANSON probe (used at 60% of the maximum power).

When deagglomeration is completed, place the beaker on a magnetic agitator.

Preparation of the Granulometer

Turn on the apparatus and allow it to warm up for 30 minutes. Rinse the disc twice with ion-exchanged water.

Introduce 15 ml of the sample to be analysed into the disc and agitate.

Enter into the software the measurement conditions mentioned above.

Carry out the measurements.

When the measurements have been carried out:
Stop the rotation of the disc.
Rinse the disc several times with ion-exchanged water.
Stop the apparatus.

Results

In the apparatus register, taking the values of the diameters passing at 16%, 50% (or median) and 84% (% mass) and also the value of the Mode (the derivative of the cumulative granulometric curve gives a frequency curve, the abscissa of the maximum of which (abscissa of the principal population) is known as the "Mode").

The "object size distribution width Ld", measured by XDC granulometry, after ultrasonic deagglomeration (in water), is equal to the ratio (d84−d16)/d50, in which each of the terms dn (n=16, 50 and 84) designates the size for which there are n % of particles (by mass) smaller than that size (the distribution width Ld is therefore calculated on the cumulative granulometric curve, taken as a whole).

For a silica S1, this object size distribution width Ld, measured by XDC granulometry, after ultrasonic deagglomeration (in water) is at least 0.91, for example at least 0.94, and it may be at least 1.04.

Reference is also made in the present description to "an object size distribution width L'd below 500 nm", measured by XDC granulometry, after ultrasonic deagglomeration (in water). The width L'd is equal to the ratio (d84−d16)/d50 in which each of the terms dn (n=16, 50 and 84) designates the size for which there are n % of particles (by mass), relative to the particles having a size of less than 500 nm, smaller than that size (the distribution width L'd is therefore calculated on the cumulative granulometric curve, truncated above 500 nm).

In addition it is possible to measure, by means of the XDC granulometric method of analysis by centrifugal sedimentation, an average size (by mass) of the particles (i.e. secondary particles or aggregates), marked $d_w$, after dispersion, by ultrasonic deagglomeration, of the silica in water. The method differs from that described previously in that the suspension formed (silica+ion-exchanged water) is deagglomerated on the one hand for 8 minutes and, on the other hand, by means of a 1.9 cm VIBRACELL ultrasonic probe (marketed by Bioblock) of 1500 watts (used at 60% of the maximum power). After analysis (sedimentation for 120 minutes) the particle size distribution by mass is calculated by the software of the granulometer. The geometric mean by mass of the particle sizes ("geometric mean (Xg)" according to the software designation), marked $d_w$, is calculated by the software on the basis of the following equation:

$$\log d_w = (\Sigma(i=1 \text{ to } i=n) m_i \log d_i)/\Sigma(i=1 \text{ to } i=n) m_i,$$

in which each of the terms $m_i$ (for i=1 to n) designates the mass of the whole of the objects in the size class $d_i$.

On the other hand, when reference is made to pore volumes in the present description, they are pore volumes as measured by mercury porosimetry, the preparation of each sample being carried out as follows: each sample is previously dried for 2 hours in an oven at 200° C., then placed into a test receptacle within 5 minutes of emerging from the oven and degassed under vacuum, for example by means of a rotary vane pump; the pore diameters (MICROMERITICS Autopore III 9420 porosimeter) are calculated by WASHBURN's equation with a contact angle theta of 140° and a surface tension gamma of 484 dynes/cm (or N/m).

The pore volume termed "$V_{(d5-d50)}$", as used in the present description, designates the pore volume constituted by the pores having diameters of between d5 and d50, and the pore volume termed "$V_{(d5-d100)}$" represents the pore volume constituted by the pores having diameters between d5 and d100, where each dn here designates the pore diameter for which n % of the total surface area of all the pores is provided by the pores having a diameter greater than that diameter (the total surface area of the pores ($S_{tot}$) may be determined from the mercury intrusion curve).

The ratio of the volumes $V_{(d5-d50)}/V_{(d5-d100)}$ is characteristic of the pore volume distribution.

In a silica S1, this ratio $V_{(d5-d50)}/V_{(d5-d100)}$ is at least 0.66, for example at least 0.68, and typically at least 0.71. This ratio $V_{(d5-d50)}/V_{d5-d100)}$ may be at least 0.73, especially at least 0.74. In certain cases, this ratio is at least 0.78, especially 0.80, and even at least 0.84.

On the other hand, a "pore distribution width ldp" may be determined from the pore distribution curve representing pore volume (in ml/g) according to the pore diameter (in nm). More specifically, as indicated in application WO 03/016215, this pore distribution width ldp is determined as follows: the coordinates $X_S$ (in nm) and $Y_S$ (in ml/g) of the point corresponding to the principal population (typically, the maximum of the pore distribution curve) are taken. An equation line $Y=Y_S/2$ is drawn; this line intersects the pore distribution curve at two points A and B having as abscissa respectively $X_A$ and $X_B$ (in nm) on either side of $X_S$. The pore distribution width is equal to the following relationship:

$$ldp = (X_A - X_B)/X_S.$$

The pore size distribution width may optionally also be reflected by the parameter "L/IF" determined by mercury porosimetry. The measurement is carried out by means of PASCAL 140 and PASCAL 440 porosimeters marketed by ThermoFinnigan, operating in the following manner: a quantity of between 50 and 500 mg (in the present case 140 mg) of sample is introduced into a measuring cell. The measuring cell is installed on the measuring station of the PASCAL 140 apparatus. The sample is then degassed under vacuum, for the amount of time required to reach a pressure of 0.01 kPa (typically of the order of 10 minutes). The measuring cell is then filled with mercury. The first part (pressures below 400 kPa) of the mercury intrusion curve Vp=f(P), where Vp is the mercury intrusion volume and P is the pressure applied, is determined on the PASCAL 140 porosimeter. The measuring cell is then installed on the measuring station of the PASCAL 440 porosimeter, the second part of the mercury intrusion curve Vp=f(P) (pressures between 100 kPa and 400 MPa) being determined on the PASCAL 440 porosimeter. The porosimeters are used in the "PASCAL" mode, so as to continually adjust the mercury intrusion speed according to the variations of the intrusion volume. The speed parameter in the "PASCAL" mode is fixed at 5. The pore radii Rp are calculated from the pressure values P by means of WASHBURN's equation, with a hypothesis of cylindrical pores, by selecting a contact angle theta of 140° and a surface tension gamma of 480 dynes/cm (or N/m). The pore volumes Vp are related to the mass of silica introduced and expressed as cm$^3$/g. The signal Vp=f(Rp) is smoothed by combining a logarithmic filter (filter parameter "smooth dumping factor" F=0.96) and a movable average filter (filter parameter "number of points to average" f=20). The pore size distribution is obtained by calculating the derivative dVp/dRp of the smoothed intrusion curve. The index of fineness IF is the pore radius value (expressed in angstroms) corresponding to the maximum of the pore size distribution dVp/dRp. The width at mid-height of the pore size distribution dVp/dRp is marked L.

A silica S1 which may be used according to the invention may for example have the following features:
- an object size distribution width Ld ((d84−d16)/d50) measured by XDC granulometry after ultrasonic deagglomeration of at least 1.04; and
- a pore volume distribution according to the pore size such that the ratio $V_{(d5-d50)}/V_{(d5-d100)}$ is at least 0.71, for example at least 0.73, especially at least 0.74, or even, in certain cases, at least 0.78, especially at least 0.80, or even at least 0.84.

According to a third advantageous embodiment of the invention, the silica used is a silica termed "silica S2", which has the following features:
- a BET specific surface area of between 60 and 550 m$^2$/g;
- a CTAB specific surface area of between 40 and 525 m$^2$/g;
- a pore distribution width ldp of more than 0.70.

The silica S2 is advantageously a precipitated silica. Preferably, it is a silica obtained by the method P defined previously in the present description.

The silica S2 may especially have a pore distribution width ldp of more than 0.80, for example more than 0.85. In certain cases, the pore distribution width is more than 1.05, for example more than 1.25, or even more than 1.40.

Moreover, the silica S2 preferably has an object size distribution width Ld ((d84−d16)/d50) measured by XDC granulometry after ultrasonic deagglomeration (in water) of at least 0.91, for example at least 0.94, especially at least 1, typically at least 1.04.

According to a fourth advantageous embodiment, the silica used according to the present invention is a silica termed "silica S3", which has the following features:
- a BET specific surface area of between 60 and 550 m$^2$/g;
- a CTAB specific surface area of between 40 and 525 m$^2$/g;
- an object size distribution width L'd ((d84−d16)/d50) below 500 nm, measured by XDC granulometry after ultrasonic deagglomeration, of at least 0.95; and
- a pore volume distribution such that the ratio $V_{(d5-d50)}/V_{(d5-d100)}$ is at least 0.71.

This silica S3 is advantageously a precipitated silica. Preferably, it is a silica obtained by the method P defined previously in the present description.

The silica S3 may especially have a ratio $V_{(d5-d50)}/V_{(d5-d100)}$ of at least 0.73, especially at least 0.74. This ratio may be at least 0.78, especially at least 0.80, even at least 0.84.

Finally, according to a fifth advantageous embodiment of the invention, the silica used according to the present invention is a silica, termed "silica S4", which has the following features:
- a BET specific surface area of between 60 and 550 m$^2$/g;
- a CTAB specific surface area of between 40 and 525 m$^2$/g;
- an object size distribution width L'd ((d84−d16)/d50) below 500 nm, measured by XDC granulometry after ultrasonic deagglomeration, of at least 0.90, especially of at least 0.92; and
- a pore volume distribution such that the ratio $V_{(d5-d50)}/V_{(d5-d100)}$ is at least 0.74.

This silica S4 is advantageously a precipitated silica. Preferably, it is a silica obtained by the method P defined previously in the present description.

The silica S4 may for example have a ratio $V_{(d5-d50)}/V_{(d5-d100)}$ of at least 0.78, especially at least 0.80, and even at least 0.84.

According to a particular variant, the aforesaid silicas S, S1, S2, S3 and S4 have the following features:
- a BET specific surface area of between 70 and 350 m$^2$/g, especially between 90 and 320 m$^2$/g; and
- a CTAB specific surface area of between 60 and 330 m$^2$/g, for example between 80 and 290 m$^2$/g.

Thus, their BET specific surface area may be between 110 and 270 m$^2$/g, especially between 115 and 250 m$^2$/g, for example between 135 and 235 m$^2$/g. Moreover, their CTAB specific surface area may be between 90 and 230 m$^2$/g, especially between 95 and 200 m$^2$/g, for example between 120 and 190 m$^2$/g.

According to another variant, the silicas S, S1, S2, S3 and S4 have the following features:
- a BET specific surface area of between 60 and 400 m$^2$/g, especially between 60 and 300 m$^2$/g; and
- a CTAB specific surface area of between 40 and 380 m$^2$/g, especially between 45 and 280 m$^2$/g.

According to this other variant, their BET specific surface area may be between 120 and 280 m$^2$/g, especially between 150 and 280 m$^2$/g. Moreover, their CTAB specific surface area may be between 115 and 260 m$^2$/g, especially between 145 and 260 m$^2$/g.

Generally, the silicas S, S1, S2, S3 and S4 may exhibit a certain microporosity. Thus, usually, the difference between their BET specific surface area and their CTAB specific surface area ($S_{BET}-S_{CTAB}$) is more than or equal to 5 m$^2$/g, typically more than or equal to 15 m$^2$/g, for example more than or equal to 25 m$^2$/g, this difference remaining however usually below 50 m$^2$/g, preferably below 40 m$^2$/g.

Moreover, in the silicas S, S1, S2, S3 and S4, the pore volume provided by the largest pores customarily represents the greater part of the structure.

The silicas S5, S2, S3, and S4 may have a pore volume constituted by the pores having diameters of between 3.7 and 80 nm of at least 1.35 cm$^3$/g, especially at least 1.40 cm$^3$/g, and even at least 1.50 cm$^3$/g.

On the other hand, the silicas S, S1, S2, S3 and S4 may have both an object size distribution width Ld of at least 1.04 and an object size distribution width L'd below 500 nm of at least 0.95.

The object size distribution width Ld of the silicas S, S1, S2, S3 and S4 may in certain cases be at least 1.10, especially at least 1.20; it may be at least 1.30, for example at least 1.50, and even at least 1.60.

Similarly, the object size distribution width L'd below 500 nm of the silicas S, S1, S2, S3 and S4 may for example be at least 1.0, especially at least 1.10, especially at least 1.20.

It should also be noted that the silicas S, S1, S2, S3 and S4 generally have a high object size, which is atypical. Thus, the mode of their granulometric distribution as measured by XDC granulometry after ultrasonic deagglomeration (in water) may for example fulfil the following condition:

XDC Mode (nm) ≥ (5320/CTAB Surface area (m$^2$/g))+8 or even the following condition:

XDC Mode (nm) ≥ (5320/SCTAB (m$^2$/g))+10.

The silicas S, S1, S2, S3 and S4 which may be used according to the invention may moreover have a particular surface chemistry, such that they have a ratio (Sears number×1000)/ (BET specific surface area) below 60, preferably below 55, for example below 50.

The "Sears number" referred to here corresponds to the volume of 0.1 M sodium hydroxide solution which is required to raise the pH from 4 to 9 of a suspension of the silica tested at 10 g/L in a sodium chloride medium at 200 g/L, as determined according to the method described by G. W. SEARS in *Analytical Chemistry*, vol. 28, No. 12, December 1956.

For a given silica, the Sears number is determined under the following conditions. From 400 grams of sodium chloride, a sodium chloride solution at 200 g/L acidified to pH 3 with a 1 M hydrochloric acid solution is prepared. The weighings are carried out by means of a METTLER precision balance. 150 ml of this sodium chloride solution are cautiously added to a 250 ml beaker into which there has previously been introduced a mass M (in g) of the sample to be analysed, corresponding to 1.5 gram of dry silica. Ultrasonics are applied to the dispersion obtained, for 8 minutes (1500 W BRANSON ultrasonic probe, amplitude 609, diameter 13 mm), the beaker being in a crystalliser filled with ice. Then the solution obtained is homogenised by magnetic agitation, by means of a 25 mm×5 mm bar magnet. It is checked that the pH of the suspension is below 4, adjusting if necessary with a 1 M hydrochloric acid solution. There is then added, by means of a Metrohm titrating pH-meter (titroprocessor 672, dosimat 655), previously calibrated by means of pH 7 and pH 4 buffer solutions, a 0.1 M sodium hydroxide solution at a flow rate of 2 ml/min. (The titrating pH-meter was programmed as follows: 1) Call up the program "Get pH", 2) Introduce the following parameters: pause (waiting time before the start of titration): 3 secs., reagent flow rate: 2 ml/min, anticipation (adaptation of the titration speed to the slope of the pH curve): 30, stop pH: 9.40, critical EP (detection sensitivity of the equivalence point): 3, carry over (printed parameters of titration ratio): 2,3,5 (i.e. creation of a detailed report, list of measurement points, titration curve)). By interpolation, the exact volumes $V_1$ and $V_2$ of the sodium hydroxide solution added in order to obtain, respectively, a pH of 4 and a pH of 9, are determined. The Sears number for 1.5 gram of dry silica is equal to the ratio:

$$((V_2-V_1)\times 150)/(ES \times M)$$

with the following meanings:
$V_1$: volume of 0.1 M sodium hydroxide solution at $pH_1=4$
$V_2$: volume of 0.1 M sodium hydroxide solution at $pH_2=9$
M: mass of the sample (g)
ES: dry extract in %

Moreover, the silicas S, S1, S2, S3 and S4 which may be used according to the invention generally have at least one, and preferably all, of the following three characteristics:

the geometric mean by mass of the particle sizes ($d_w$) as measured by means of the XDC granulometric analysis method fulfils the following condition:

$$d_w \geq (16500/S_{CTAB})-30,$$

where $S_{CTAB}$ designates the CTAB specific surface area expressed in $m^2/g$;

the porosity is such that the ratio L/IF fulfils the following condition:

$$L/IF \geq -0.0025 S_{CTAB}+0.85$$

where $S_{CTAB}$ designates the CTAB specific surface area expressed in $m^2/g$;

the number of silanols per unit of surface area ($N_{SiOH/nm2}$) is such that:

$$N_{SiOH/nm2} \geq -0.027 S_{CTAB}+10.5.$$

where:
$S_{CTAB}$ designates the CTAB specific surface area expressed in $m^2/g$; and the number of silanols per $nm^2$ of surface area is determined by grafting methanol onto the surface of the silica, preferably under the conditions disclosed below:

1 g of raw silica is suspended in 10 ml of methanol, in a 110 ml autoclave (Top Industrie, reference 09990009). A bar magnet is introduced and the autoclave, hermetically sealed and heat insulated, is heated at 200° C. (40 bars) on the magnetic heating agitator for 4 hours. The autoclave is then cooled in a cold water bath. The grafted silica is recovered by decanting and the residual methanol is evaporated under a flow of nitrogen. Finally, the grafted silica is dried at 130° C. under vacuum for 12 hours. The carbon content is determined by means of an elementary analyser (NCS 2500 analyser of CE Instruments) on the raw silica and on the grafted silica. This dosing on the grafted silica is carried out during the three days which follow the end of the drying, the humidity of the air or the heat being able in fact to bring about hydrolysis of the methanol graft. The number of silanols per $nm^2$ is then calculated by the following formula:

$$N_{SiOH/nm2}=[(\% C_g - \% C_b)\times 6.023\times 10^{23}]/[S_{BET}\times 10^{18}\times 12\times 100]$$

with the following meanings:
% $C_g$: mass percentage of carbon present on the grafted silica
% $C_b$: mass percentage of carbon present on the raw silica
$S_{BET}$: BET specific surface area of the silica (expressed in $m^2/g$)

Whatever may be the exact manner of preparation of the silica used according to the invention and its porosity, granulometry and surface chemistry characteristics, an important characteristic of this silica is its specific surface area, which is more than or equal to 60 $m^2/g$, thereby making it possible to obtain the increase in the rigidity of the material sought according to the invention.

Generally, the greater the specific surface area of a silica used according to the invention, the more pronounced the improvement in the rigidity obtained. From this point of view, it is therefore usually preferred to use silicas having a BET specific surface area of at least 80 $m^2/g$, even at least 90 $m^2/g$, and more preferably at least 100 $m^2/g$. According to an advantageous embodiment, the silica used has a BET specific surface area of at least 120 $m^2/g$, even at least 150 $m^2/g$, for example at least 170 $m^2/g$.

Moreover, it is usually preferred for a silica used according to the invention to be present in the state of objects (particles, aggregates and/or agglomerates) as finely divided and dispersed as possible, this proving advantageous especially as far as the impact resistance of the material is concerned. Thus, without wishing to be bound to a particular theory, the work carried out by the inventors makes it possible to establish that the more finely the silica is dispersed in the material, the greater the increase observed in the impact resistance.

It should be noted that the silicas S, S1, S2, S3, and S4 which have been described previously in the present description are silicas which have high BET specific surface areas, typically more than or equal to 60 $m^2/g$. In addition, these specific silicas are generally found dispersed in the form of very small objects in the thermoplastic polymeric materials into which they are introduced as inorganic filler (typically they are found substantially in the form of objects having dimensions of less than 5 microns, and usually less than 1 micron, or even less). These silicas are thus of particular advantage for the implementation of the present invention.

On this subject, it should be emphasised that the silicas S, S1, S2, S3 and S4 often exhibit a very good aptitude for dispersion, especially in the thermoplastic polymers.

This aptitude for dispersion (and for deagglomeration) may be quantified especially by means of the following specific deagglomeration tests:

a first deagglomeration test is carried out by estimating the cohesion of the agglomerates by granulometric measurement (by laser diffraction), carried out on a silica suspension previously deagglomerated by means of ultrasonification. The aptitude of the silica for deagglomeration is thus measured (fracture of objects of 0.1 to several tenths of microns).

In this test, ultrasonic deagglomeration is carried out by means of a VIBRACELL BIOBLOCK (600 W) sonificator, equipped with a 19 mm diameter probe. Granulometric measurement is carried out by laser diffraction on a SYMPATEC granulometer. 2 grams of silica are weighed in a pill machine (height: 6 cm and diameter: 4 cm) and made up to 50 grams by the addition of ion-exchanged water: a 4% aqueous suspension of silica is thus produced which is homogenised for 2 minutes by magnetic agitation. Ultrasonic deagglomeration is then carried out as follows: with the probe immersed over a length of 4 cm, the output power is regulated in such a way as to obtain a deflection of the needle of the power dial indicating 20%. Deagglomeration is carried out for 420 seconds. Granulometric measurement is then performed after introducing a known volume (expressed in ml) of the homogenised suspension into the vessel of the granulometer.

The greater the aptitude of the silica for deagglomeration, the lower the value of the median diameter $\phi_{50S}$ (or "Sympatec median diameter") obtained. It is also possible to determine the ratio (10× volume of suspension introduced (in ml))/optical density of the suspension detected by granulometry (this optical density is of the order of 20). This ratio is indicative of the rate of particles having a size of less than 0.1 μm which are not detected by the granulometer. This ratio is known as the (Sympatec) ultrasonic deagglomeration factor ($F_{DS}$).

Another deagglomeration test is carried out by estimating the cohesion of the agglomerates by granulometric measurement (by laser diffraction), carried out on a silica suspension previously deagglomerated by ultrasonification. Thus the aptitude of the silica for deagglomeration is measured (fracture of objects of 0.1 to several tenths of microns).

In this test, ultrasonic deagglomeration is carried out by means of a VIBRACELL BIOBLOCK (600 W) sonificator, used at 80% of the maximum power and equipped with a 19 mm diameter probe. Granulometric measurement is carried out by laser diffraction on a MALVERN (Mastersizer 2000) granulometer. 1 gram of silica is weighed in a pill machine (height: 6 cm and diameter: 4 cm) and made up to 50 grams by the addition of ion-exchanged water: a 2% aqueous suspension of silica is thus produced which is homogenised for 2 minutes by magnetic agitation. Ultrasonic deagglomeration is then carried out for 420 seconds. Granulometric measurement is then performed after introducing the whole of the homogenised suspension into the vessel of the granulometer.

The greater the aptitude of the silica for deagglomeration, the lower the value of the median diameter $\phi_{50M}$ (or "Malvern median diameter") obtained. It is also possible to determine the ratio (10× obscuration value of the blue laser)/obscuration value of the red laser. This ratio is indicative of the rate of particles having a size of less than 0.1 μm. This ratio is known as the (Malvern) ultrasonic deagglomeration factor ($F_{DM}$).

A deagglomeration speed, marked α, may be measured by means of another ultrasonic deagglomeration test, at 100% power of a 600 watt probe, operating in pulsed mode (i.e.: 1 second ON, 1 second OFF) in order to avoid excessive heating up of the ultrasonic probe during measurement. This known test, which is the subject especially of application WO99/28376 (see also applications WO99/28380, WO00/73372, WO00/73373) makes it possible to measure continually the development of the average size (by volume) of the agglomerates of particles during sonification, according to the indications below. The set-up used consists of a laser granulometer ("MASTERSIZER S", marketed by Malvern Instruments—He—Ne laser source emitting in the red range, wavelength 632.8 nm) and of its preparator ("Malvern Small Sample Unit MSX1"), between which has been inserted a continuous flow treatment cell (BIOBLOCK M72410) equipped with an ultrasonic probe (VIBRACELL 600 watt 12.7 mm sonificator marketed by Bioblock). A small quantity (150 mg) of silica to be analysed is introduced into the preparator with 160 ml of water, the circulation speed being fixed at its maximum. At least three consecutive measurements are performed in order to determine according to the known Fraunhofer calculation method (Malvern 3$$D calculation matrix) the initial average diameter (by volume) of the agglomerates, marked $d_v[0]$. The sonification (pulsed mode: 1 sec. ON, 1 sec. OFF) is then established at 100% power (or 100% of the maximum position of the "tip amplitude") and for approximately 8 minutes the development of the average diameter (by volume) $d_v[t]$ over time "t" is followed by means of one measurement approximately every 10 seconds. After an induction period (around 3-4 minutes), it is observed that the inverse of the average diameter (by volume) $1/d_v[t]$ varies in a linear, or substantially linear manner, with the time "t" (stable deagglomeration rate). The deagglomeration speed α is calculated by linear regression of the development curve of $1/d_v[t]$ according to the time "t", in the stable deagglomeration rate zone (in general, between approx. 4 and 8 minutes); it is expressed in $\mu m^{-1} \cdot min^{-1}$.

The application WO99/28376 describes in detail a measuring device which can be used for carrying out the ultrasonic deagglomeration test. This device consists of a closed circuit in which a flow of agglomerates of particles in suspension in a liquid can circulate.

The device substantially comprises a sample preparator, a laser granulometer and a treatment cell. Setting to atmospheric pressure, at the sample preparator and at the treatment cell itself, permits continual elimination of the air-bubbles which form during sonification (action of the ultrasonic probe). The sample preparator ("Malvern Small Sample Unit MSX1") is intended to receive the sample of silica to be tested (in suspension in the liquid) and to circulate it through the circuit at the preset speed (potentiometer–maximum speed of around 3 L/min), in the form of a flow of liquid suspension. The preparator consists simply of a receiving vessel which contains, and through which circulates, the suspension to be analysed. It is equipped with a variable speed agitator motor, in order to avoid sedimentation of the agglomerates of particles of the suspension; a centrifugal mini-pump is intended to circulate the suspension in the circuit; the inlet of the preparator is connected to the open air via an opening intended to receive the filler sample to be tested and/or the liquid used for the suspension. Connected to the preparator is a laser granulometer ("Mastersizer S"), the function of which is to measure continually, at regular intervals, the average size by volume "$d_v$" of the agglomerates, as the flow passes through, by means of a measuring cell to which the automatic recording and calculating means of the granulometer are connected.

A brief reminder is given here that laser granulometers exploit, in a known manner, the principle of diffraction of light by solid objects placed in suspension in a medium having a refractive index different from that of the solid. According to the Fraunhofer theory, there is a relationship between the size of the object and the angle of diffraction of the light (the smaller the object the higher the diffraction angle).

In practice, it is sufficient to measure the quantity of light diffracted for different diffraction angles in order to be able to determine the size distribution (by volume) of the sample, $d_v$ corresponding to the average size by volume of this distribution ($d_v = \Sigma(n_i d_i^4)/\Sigma(n_i d_i^3)$) where each $n_i$ designates the number of objects of the size class or diameter $d_i$).

Finally, inserted between the preparator and the laser granulometer there is a treatment cell equipped with an ultrasonic probe, capable of functioning in continuous or pulsed mode, and intended to break up continually the agglomerates of particles as the flow passes through. The flow is thermostatically controlled via a cooling circuit arranged, at the cell, in a double envelope surrounding the probe, the temperature being controlled for example by a temperature probe immersed in the liquid at the preparator.

The median diameter $\phi_{50S}$ of the silicas S, S1, S2, S3 and S4, after ultrasonic deagglomeration, is generally below 8.5 μm; it may be below 6.0 μm, for example below 5.5 μm.

Similarly, the median diameter $\phi_{50M}$ of the silicas S, S1, S2, S3 and S4, after ultrasonic deagglomeration, is generally below 8.5 μm; it may be below 6.0 μm, for example below 5.5 μm.

The silicas S, S1, S2, S3 and S4 may moreover have a deagglomeration speed α, measured according to the ultrasonic deagglomeration test in pulsed mode described above, at 100% power of a 600 watt ultrasonic probe, of at least 0.0035 μm$^{-1}$·min$^{-1}$, especially at least 0.0037 μm$^{1}$·min$^{-1}$.

The silicas S, S1, S2, S3 and S4 may moreover have an ultrasonic deagglomeration factor ($F_{DS}$) of more than 3 ml, especially more than 3.5 ml, especially more than 4.5 ml. Their ultrasonic deagglomeration factor ($F_{DM}$), for its part, may be more than 6, especially more than 7, especially more than 11.

On the other hand, the silicas according to the present invention may have an average particle size (by mass), measured by XDC granulometry after ultrasonic deagglomeration, $d_w$, of between 20 and 300 nm, especially between 30 and 300 nm, for example between 40 and 160 nm.

The work carried out by the inventors now makes it possible to establish that the particularly advantageous results which were observed with the aforesaid specific silicas S, S1, S2, S3 and S4 may be generalised to other, silicas, provided that these silicas (1) have a BET specific surface area of at least 60 m²/g, and (2) are dispersed in the state of objects in a sufficiently divided state in the thermoplastic polymeric material in which they are incorporated.

Thus, according to another particular aspect, the present invention has as its subject the use of any silica (termed hereinafter "silica $S_0$") having a BET specific surface area of at least 60 m²/g, and present in the polymer substantially in the form of dispersed objects having a size of less than 5 microns (and preferably less than 1 micron), as inorganic filler in a thermoplastic polymeric material, in order to increase the rigidity of said material, while maintaining or improving its impact resistance.

As an example, it is possible to use as silica $S_0$ of the aforesaid type the specific silicas S, S1, S2, S3 and S4 described previously in the present description. Other silicas which have the required specific surface area, associated with a sufficient dispersibility within the polymeric material, are also adapted to the implementation of the present invention. In general, the silica $S_0$ is preferably a precipitated silica.

Usually, the silicas having very high specific surface areas exhibit relatively limited dispersibility properties, and thus it generally proves difficult to disperse them in a polymeric material in the form of objects of very small dimensions. Thus, in practice, as silica $S_0$, silicas are typically used which have a BET specific surface area below or equal to 300 m²/g, for example below or equal to 250 m²/g. Thus a silica used as silica $S_0$, as a general rule, has a BET specific surface area of between 60 and 300 m²/g, for example between 100 and 250 m²/g, and especially between 150 and 200 m²/g. However, the use of silicas having higher specific surface areas is not ruled out, provided that they can be dispersed in the material substantially in the form of dispersed objects having a size of less than 5 microns, and preferably less than 1 micron.

Moreover, whatever their exact nature, an important characteristic of the type $S_0$ silicas is their state of dispersion in the material in which they are incorporated. As a general rule, the impact resistance properties of the material obtained by employing an $S_0$ type silica depend to a great extent on this dispersed state, and the more so the greater the specific surface area of the silica used.

Thus, it is generally preferable for the $S_0$ silica to be present in the material in the form of aggregates, agglomerates and/or particles of which at least 90% in number, preferably at least 95% in number, and advantageously at least 98% in number, have dimensions of less than 5 microns, preferably less than 1 micron, the rest of the particles in general having dimensions of less than 10 microns.

Advantageously, the $S_0$ silica is dispersed in the form of objects (aggregates, agglomerates and/or particles) of which at least 80% in number, preferably at least 90% in number, and advantageously at least 956 in number, have dimensions of between 30 nm and 1000 nm, for example between 50 and 900 nm, especially between 100 nm and 800 nm. With such silica dispersion conditions, an increase both in the rigidity and the impact resistance of the material is usually obtained.

The dispersed state of the silica in a thermoplastic polymeric material of the type of the invention may moreover be quantified by analysis of a plurality of scanning electron microscope slides (typically with enlargement×1000) carried out on a plurality of plane sections of material obtained by ultracryotomy (typically sections having dimensions of 110 μm×70 μm). Image analysis of this type of slide makes it possible, by image analysis, to determine the fraction of the surface of the image occupied by the objects having a size of more than 5 μm. Within this scope, a surface fraction "$FS_{5\mu m}$" is determined (equal to the surface area occupied by the objects having a size of more than 5 μm related to the total surface area of the image). The ratio of this surface fraction $FS_{5\mu m}$ relative to the volume fraction FV of silica in the material (ratio of the volume occupied by the silica in the material relative to the total volume of material) is characteristic of the dispersion of the silica in the material.

A suitable dispersion according to the invention corresponds in general to a ratio $FS_{5\mu m}/FV$ below or equal to 4, preferably below or equal to 3, advantageously below or equal to 2, and more preferably below or equal to 1.

Typically, the surface fraction $FS_{5\mu m}$ referred to above can be measured under the following conditions:

Preparation of the Sample
Plane sections of the sample are produced by pre-cutting by means of an Ultratrim (Reichert-Jung). The definitive surfacing of the sample is carried out by means of an ULTRACUT E (Reichert-Jung) ultra-microtome equipped with 3 nm width DIATOME diamond cutters. The surfaced block obtained has a width of 2 nm and a length of around 4 nm.

Observations

The surfaced block obtained is then observed by scanning microscopy for the evaluation of the macrodispersion. The microscope used is a MEB/FEG (field effect emission) LEO 1525. For each sample, a series of at least 10 secondary electron images is produced at different locations on the materials, in order to obtain a representative measurement of the material. The size of each image is 1024×768 pixels.

Image Analysis

The digital images obtained are then processed by image analysis by means of the VISILOG software, according to the following steps:

thresholding/binarisation: thresholding makes it possible to extract from the image all the pixels having a value within a given range; it therefore makes it possible to discriminate the particles within the matrix; binarisation consists in assigning to each pixel of the image a digital value (0 or 1) according to whether it belongs to the matrix or to the filler (0 for the matrix, 1 for the filler).

Erosion/expansion: erosion of the image obtained by a structuring element having a size of 2.5 microns makes it possible to subtract from the image all the objects having a size of less than 5 microns. Expansion of the resultant image then makes it possible to reconstruct the image.

Measurement: addition of the value of all the pixels of the image and then standardisation by surface area are carried out; the value obtained then corresponds to the surface rate of objects having a size of more than 5 microns.

More generally, the silicas S, S1, S2, S4 and $S_0$ which may be used according to the invention preferably have a BET specific surface area of between 60 and 300 $m^2/g$, for example between 100 and 250 $m^2/g$, and especially between 150 and 200 $m^2/g$.

Moreover, the silicas S, S1, S2, S3, S4 and $S_0$ which may be used according to the invention preferably have a pH of between 6.3 and 7.8, especially between 6.6 and 7.5. The pH is that measured according to Standard ISO 787/9 (pH of a suspension of the silica tested at 5% in water).

The silicas S, S1, S2, S3, S4 and $S_0$ moreover have a DOP oil take-up varying, usually, between 220 and 330 ml/100 g, for example between 240 and 300 ml/100 g. The DOP oil take-up referred to in the present description is determined according to Standard NF T 30-022 (March 1953) using dioctylphthalate.

On the other hand, the silicas S, S1, S2, S3, S4 and $S_0$ used according to the invention are advantageously in the form of powders, preferably powders having an average size of at least 15 μm, for example between 15 and 60 μm (especially between 20 and 45 μm) or between 30 and 150 μm (especially between 45 and 120 μm).

Alternatively, the silicas S, S1, S2, S3, S4 and $S_0$ used according to the invention may also be in the form of substantially spherical balls having an average size of at least 80 μm. This average size of the balls may be at least 100 μm, for example at least 150 μm; it is generally at most 300 μm and lies preferably between 100 and 270 μm. This average size is determined according to Standard NF X 11507 (December 1970) by dry screening and determination of the diameter corresponding to a cumulative rejection of 50%.

Whatever their exact nature, the aforesaid silicas S, S1, S2, S3, S4 and $S_0$ prove to be particularly suitable as inorganic fillers for improving the rigidity of thermoplastic polymeric materials, without reducing the impact resistance, and even improving the impact resistance in certain cases, and usually improving, at the same time, other characteristics such as the tensile elongation of the material and the scratch resistance.

The term "thermoplastic polymeric material", as used in the present description, refers to a material comprising as its major constituent a thermoplastic polymer or a mixture of thermoplastic polymers, and behaving overall as a thermoplastic polymer. Thus, a thermoplastic polymeric material in the sense of the present description generally comprises at least 50% by mass of a thermoplastic polymer or of a mixture of thermoplastic polymers, usually at least 75% by mass, for example at least 80% by mass, and typically at least 90% or even at least 95% by mass. Besides this/these thermoplastic polymer(s) and the silica used as the filler, the thermoplastic polymeric material may comprise further ingredients such as additives allowing the polymer to be preserved or used effectively, or else additives further improving the impact resistance properties of the material (polymeric fillers or inorganic fillers surface-treated with fatty acids, for example). The silica of the invention may also be used in combination with other inorganic fillers, such as other silicas, talc, wollastonite, kaolin, mica, calcium carbonate, glass fibres and/or silicates. The presence of these additional agents may make it possible to improve still further the effect of improvement in the rigidity sought according to the invention, and/or to improve other characteristics of the material, especially the impact resistance. Especially, the use of the silica of the invention in conjunction with other inorganic fillers may prove advantageous for improving the scratch resistance of the material.

Nevertheless, the presence of additional components of this type is in no way essential for obtaining the effect of improving the rigidity sought according to the invention. According to a particular embodiment, the silica of the invention is used as the sole inorganic filler in the thermoplastic polymeric material.

Moreover, it should be noted that the silica used according to the invention does not in general necessitate any surface treatment, especially with organic molecules such as fatty acids, to obtain the rigidity improving effect of the invention. Nevertheless, according to a conceivable embodiment, the polymeric material may comprise an additive selected from silanes, fatty acids, phosphonic acids, titanates, polypropylene waxes, polyethylene waxes and/or maleic anhydride grafted polypropylenes, providing, especially, improved compatibility between the silica (and any other inorganic fillers present) and the thermoplastic polymers.

The silicas of the invention have proved particularly advantageous as inorganic fillers in thermoplastic polymeric materials based on one or more polymers selected from polyolefins, polyamides (especially polyamides 6, polyamides 66, polyamides 11, polyamides 12, polymetaxylylenediamenes, mixtures and copolymers based on these polyamides), polyesters, poly(arylene) oxides, polyvinyl chlorides, polyvinylidene chloride, polyvinyl acetate, mixtures of these polymers and copolymers based on these polymers.

Especially, the silicas of the invention are particularly suitable for improving the impact resistance of thermoplastic polymeric materials based on one or more polyolefins and, especially, polymeric materials comprising:

a homopolyolefin selected from a polyethylene, a polypropylene, a polybutylene, or a poly(methylpentene);

a copolymeric polyolefin based on at least two types of units selected from ethylene, propylene, butylene and methylpentene units; or a mixture of two or more of said homopolyolefins and/or said copolymeric polyolefins.

The silicas which may be used according to the invention are, for example, highly suitable as a filler in thermoplastic materials based on polypropylene, polyethylene or based on mixtures of these polymers or of the copolymers thereof. According to an especially advantageous embodiment, the thermoplastic polymeric material incorporating the silica filler according to the invention is a material based on polypropylene or on a copolymer of propylene and ethylene.

Whatever the nature of the thermoplastic material, the silica used as filler according to the invention is generally at a content of between 0.5% and 10% by mass, for example between 1 and 7%, for example between 2 and 6%, relative to the total mass of the thermoplastic polymeric material including the silica.

The silica may be incorporated into the material using any means known per se for the incorporation of inorganic fillers into a thermoplastic polymeric matrix, provided that it leads to dispersion of the silica such as is required according to the invention. For this purpose, the silica is advantageously incorporated by mixing under stress the silica and the polymer(s) of the material beyond their glass transition temperature, optionally in the presence of additives, for example heat stabilisers of the type IRGANOX®B225 marketed by Ciba, advantageously using internal or extruder-type mixers.

According to a specific aspect, the invention also has as its subject the thermoplastic polymeric materials comprising a silica S, S1, S2, S3, S4 or $S_0$, of the aforesaid type, as an inorganic filler improving the rigidity thereof.

These materials are particularly suitable for the production of coating layers, mechanical parts or car parts, and especially for the manufacture of thin parts having good mechanical properties.

More specifically, the invention also has as its subject the thermoplastic materials of this type which comprise one or more polyolefins as the major constituent (i.e. constituting more than 50% by mass, generally at least 75% by mass, for example at least 90%, or even 95% by mass of the material) and, more specifically, materials of this type comprising polypropylene as the major constituent. In these materials, the introduction of the silica of the invention as an inorganic filler usually provides polymeric materials having optical properties similar to the non-filled material, in contrast to what is observed with most inorganic fillers which lead to modification of the hue of the material, its transparency or its light diffusion properties. The preservation of the optical properties of the starting material is often such that the introduction of the silica into the material does not lead to modification of the visual appearance of the material. The modification of the properties of the material may moreover be quantified more precisely, for example by spectro-colorimetry, which usually reveals that the introduction of a silica of the invention into a polymeric material based on a polyolefin such as polyethylene leads at most to very slight modifications of the transparency, light transmission and colouring properties of the material.

These properties make it possible especially to obtain thermoplastic polyolefinic materials which are impact resistant and have good transparency properties.

Various aspects and advantages of the invention will also emerge from the illustrative and non-limiting examples provided hereinafter, in which, as the silica of the invention, a silica S was used which is a silica having a BET specific surface area of more than 100 m²/g, and which is obtained by the method P as defined previously in the present description.

EXAMPLE 1

Use of the Silica S for Improving the Impact Resistance of a Polypropylene-Based Thermoplastic Material Incorporation of the Silica in the Material by Means of an Internal Mixer The silica S was used as an inorganic filler for improving the impact resistance of a polymeric material having the following Formulation (1) (the percentages indicated are percentages by mass relative to the total mass of the formulation):

polypropylene: 96.8%
heat stabiliser: 0.2%
silica S: 3%

The polypropylene used in this example is the polypropylene marketed under the name of PPH 4060 by Atofina (homopolymeric polypropylene having a melt flow index (230° C. under 2.16 kg) of 3 g/10 min.).

The heat stabiliser, for its part, is IRGANOX®B225 marketed by Ciba (mixture of antioxidants based on phenolic compounds).

The polymeric material incorporating the silica was prepared by introducing 35 g of polypropylene, 0.07 g of heat stabiliser and 1.1 g of silica S into a Brabender internal mixer initially brought to a temperature of 150° C., with a filling rate of 0.7, wherein the tank of the internal mixer is equipped with two W50-type rotors for thermoplastics, rotating at a speed of 125 r.p.m.

The constituents introduced under these conditions were mixed for 5 minutes, the temperature rising during the mixing in view of the internal shearing, leading to a final temperature of the order of 180° C.

A portion of the formulation thus obtained was press moulded in a parallelepiped mould having dimensions of 100 mm×100 mm×10 mm, between two compression plates heated to 200° C. under a pressure of 200 bars ($2.10^{-3}$ Pa) for 2 minutes. The mould was then cooled between the two plates brought to 18° C. under a pressure of 200 bars, for 4 minutes.

On the polymer panel obtained, a plurality of electron microscope slides were taken at different locations on the basis of which the surface fraction $FS_{5\mu m}$ was determined (proportion of surface area occupied by the objects having a size of more than 5 μm on the images obtained), by image analysis under the specific conditions defined previously in the description. The surface fraction $FS_{5\mu m}$ thus measured is 4%.

In this example, the volume fraction FV of silica in the material (ratio of the volume occupied by the silica in the material related to the total volume of the material) is 1.4% (mass fraction of 3%). The ratio $FS_{5}\mu/FV$ of the material is therefore 2.93 in this example.

Moreover, two parallelepiped samples having dimensions of 80 mm×4 mm×10 mm were cut from the polymer panel obtained at the end of the moulding process.

On the first sample, the flexural modulus was measured under the conditions of Standard ISO 178 at 23° C.

On the second sample, the energy at break was measured using the Charpy impact resistance test at 23° C. on the cut sample, under the conditions of Standard ISO 179 at 23° C.

By way of comparison, the same tests were carried out on samples prepared under the same conditions but from a control formulation (T1) without silica.

The results obtained are set out in Table I below, which shows that the presence of silica as an inorganic filler in the formulation increases both the rigidity (increase in the flexural modulus) and the impact resistance (increase in the energy at break).

TABLE I

|  | Formulation (1) | Control (T1) |
|---|---|---|
| Polypropylene (PPH 4060) | 96.8% | 99.8% |
| Heat stabiliser (IRGANOX ®B225 | 0.2% | 0.2% |
| silica S | 3% | — |
| Flexural modulus (GPa) | 1.53 | 1.30 |
| Charpy impact resistance at 23° C. (kJ/m$^2$) | 5.5 | 5.1 |

EXAMPLE 2

Use of the Silica S for Improving the Impact Resistance of a Polypropylene-Based Thermoplastic Material Incorporation of the Silica in the Material by Means of an Extruder The silica S was used as an inorganic filler for improving the impact resistance of a polymeric material having the same overall formulation as that of example 1, but differing in terms of the manner in which the silica was incorporated.

More specifically, in this example the polymeric material has the following Formulation (2):
polypropylene PPH 4060: 96.8%
heat stabiliser IRGANOX®B225: 0.2%
silica S: 3%

The silica was incorporated into the material by introducing 2420 g of polypropylene, 5 g of heat stabiliser and 75 g of silica S into a cubical mixer and mixing for 10 minutes at 150° C., then introducing the mixture into a WERNER ZSK30 twin-screw extruder (die), with a temperature profile in the extruder of 168° C./168° C./182° C./188° C./182° C., a rotational speed of the co-rotating screws of 230 r.p.m., and a rate of introduction of the constituents at the input suitable for obtaining a torque of 45% of the maximum torque of the extruder.

The rod obtained at the die output was cooled then cut up into granules; then the granules obtained were introduced into an ARBURG injection mould with a temperature profile of 180° C./180° C./180° C./180° C./40° C., and an injection pressure fixed at 55% of the maximum pressure of the machine, so as to form a polymer panel.

On this polymer panel, as in the previous example, a plurality of electron microscope slides were taken at different locations on the basis of which the surface fraction $FS_{5\mu m}$ was determined by image analysis under the specific conditions defined previously in the description. The surface fraction $FS_{5\mu m}$ thus measured is in this example 5.5%.

Here again, the volume fraction FV of silica in the material is 1.4% (mass fraction of 3%). The ratio $FS_{5\mu m}/FV$ of the material is therefore 4.

Moreover, two parallelepiped samples having dimensions of 80 mm×4 mm×10 mm were cut from the polymer panel and used as in example 1:
on the first sample, the flexural modulus was measured under the conditions of Standard ISO 178.

on a second sample, the energy at break was measured using the Charpy impact resistance test at 23° C. on the cut sample, under the conditions of Standard ISO 179.

Moreover, a dumbbell-shaped sample was also cut out to determine the tensile elongation at break in accordance with Standard ISO 527.

The dynamic scratch resistance properties of the material were also measured by moving a diamond stylus, having an internal angle of 90° and a point radius of 90 microns, on the surface of a sample of the material at a speed of 1 mm/sec, applying a normal controlled force on the surface.

This operation was carried out several times in order to produce several scratches on the material with crossing applied forces (0.25N, 0.5N, 1N, 5N) until a scratch at least 200 microns wide was obtained, the results then being analysed by means of an ALTI SURF 500 profilometer, enabling the topological characteristics of the scratches (depth, width, profile) to be measured. The scratch depth was measured for an applied force of 1N, and the scratch hardness Hs was measured for 100 microns (determined according to the formula $Hs=4F/_{\pi}D^2$, where F designates the normal force which must be applied to create a dynamic fissure 100 microns thick and D designates this scratch width of 100 microns).

By way of comparison, the same tests were carried out on samples prepared under the same conditions, but from a control formulation (T2) without silica.

The results obtained are set out in Table II below, which shows that, here again, the incorporation of silica in the polymeric material induces an increase both in the impact resistance and in the rigidity, with, in addition, an increase in the tensile elongation at break.

TABLE II

|  | Formulation (2) | Control (T2) |
|---|---|---|
| Polypropylene (PPH 4060) | 96.8% | 99.8% |
| Heat stabiliser (IRGANOX ®B225 | 0.2% | 0.2% |
| silica S | 3% | — |
| Flexural modulus (GPa) | 1.52 | 1.36 |
| Charpy impact resistance at 23° C. (kJ/m$^2$) | 3.2 | 3.3 |
| Tensile elongation at break | 2.3 | 0.7 |
| Scratch depth at 1N (μm) | 3.4 | 4.9 |
| Hs at 100 microns (MPa) | 91 | 70 |

In this example, the optical properties of the two materials were also compared by means of a MINOLTA CM508 spectro-colorimeter. The results obtained are set out in Table III below, which shows that the two materials have similar optical qualities.

TABLE III

| Optical properties | L* | a* | b* | contrast |
|---|---|---|---|---|
| Formulation (2) | 66 | 0.5 | 10 | 23 |
| Control (T2) | 68 | 0.7 | 8.6 | 28 |

L*: luminance on a black background
a*: colorimetric index (red-green axis)
b*: colorimetric index (yellow-blue axis)
Contrast: black background/white background contrast; reflects the light transmission properties

The invention claimed is:

1. A method for preparing a thermoplastic polymeric material, which comprises incorporating into said thermoplastic polymeric material a silica (S) as an inorganic filler, said silica having a BET specific surface area of at least 60 m²/g, and which is obtained according to a method (P) comprising reacting a silicate with an acidifying agent, thereby obtaining a silica suspension, then separating and drying the suspension, wherein the reaction of the silicate with the acidifying agent is performed according to the following consecutive steps:
   (i) forming an aqueous starter having a pH of between 2 and 5;
   (ii) adding silicate and acidifying agent simultaneously to said starter in such a way that the pH of the reaction medium is kept between 2 and 5;
   (iii) stopping the addition of the acidifying agent while continuing the addition of silicate to the reaction medium until a pH value of the reaction medium of between 7 and 10 is obtained;
   (iv) adding silicate and acidifying agent simultaneously to the reaction medium in such a way that the pH of the reaction medium is kept between 7 and 10; and
   (v) stopping the addition of the silicate while continuing the addition of the acidifying agent to the reaction medium until a pH value of the reaction medium of less than 6 is obtained,
wherein the inorganic filler increases the rigidity of the thermoplastic polymeric material while maintaining or improving its impact resistance, and wherein the thermoplastic polymeric material comprises at least 90% by mass of:
   a homopolyolefin selected from the group consisting of a polyethylene, a polypropylene, a polybutylene and a poly(methylpentene);
   a copolymeric polyolefin formed from at least two different members selected from the group consisting of ethylene, propylene, butylene and methylpentene units; or
   a mixture of two or more of said homopolyolefins and/or said copolymeric polyolefins,
and the remainder of the material is a silica (S) and optionally one or more additives and/or inorganic fillers.

2. The method of claim 1, wherein, in step (ii) of the method P, the acidifying agent and the silicate are added in such a way that the pH of the reaction medium is kept between 3 and 4.5, during the addition.

3. The method of claim 1, wherein the simultaneous addition of step (ii) of the method P is carried out in such a way that the pH value of the reaction medium is always equal to the pH value reached at the end of step (i), to within ±0.2 unit.

4. The method of claim 1, wherein, in step (iv) of the method P, the addition of the acidifying agent and the silicate is carried out in such a way that the pH of the reaction medium is kept between 7.5 and 9.5.

5. The method of claim 4, wherein, in step (iv) of the method P, the pH of the reaction medium is kept between 7.5 and 8.5.

6. The method of claim 4, wherein the simultaneous addition of step (iv) of the method P is carried out in such a way that the pH value of the reaction medium is always equal to a pH value of between 7.5 and 9.5, to within ±0.2 unit.

7. The method of claim 1, wherein, in the method P, the suspension is dried by spraying.

8. The method of claim 1, wherein the silica (S) is obtained according to a method comprising the following consecutive steps:
   (i) forming an aqueous starter having a pH of between 3 and 4.5;
   (ii) adding silicate and acidifying agent simultaneously to said starter in such a way that the pH of the reaction medium is kept at the value reached at the end of step (i) to within ±0.2 unit;
   (iii) stopping the addition of the acidifying agent while continuing the addition of silicate to the reaction medium until a pH value of the reaction medium of between 7 and 9.5 is obtained;
   (iv) adding silicate and acidifying agent simultaneously to the reaction medium in such a way that the pH of the reaction medium is kept at the value reached at the end of step (iii) to within ±0.2 unit;
   (v) stopping the addition of the silicate while continuing the addition of the acidifying agent to the reaction medium until a pH value of the reaction medium of between 3 and 5.5 is obtained;
   (vi) leaving the medium to mature;
   (vii) filtering the silica suspension obtained at the end of step (vi), thereby obtaining a filter cake;
   (viii) cleaving the filter cake mechanically in the presence of sodium aluminate; and
   (ix) drying the cleaved cake thus obtained.

9. A method for preparing a thermoplastic polymeric material, which comprises incorporating into said thermoplastic polymeric material a silica (S1) as an inorganic filler, said silica having the following features:
   a BET specific surface area of between 60 and 550 m²/g;
   a CTAB specific surface area of between 40 and 525 m²/g;
   an object size distribution width Ld ((d84−d16)/d50) measured by XDC granulometry after ultrasonic deagglomeration of at least 0.91; and
   a pore volume distribution such that the ratio $V_{(d5-d50)}/V_{(d5-d100)}$ is at least 0.66;
said silica being obtained according to the method P comprising reacting a silicate with an acidifying agent, thereby obtaining a silica suspension, then separating and drying the suspension, wherein the reaction of the silicate with the acidifying agent is performed according to the following consecutive steps:
   (i) forming an aqueous starter having a pH of between 2 and 5;
   (ii) adding silicate and acidifying agent simultaneously to said starter in such a way that the pH of the reaction medium is kept between 2 and 5;
   (iii) stopping the addition of the acidifying agent while continuing the addition of silicate to the reaction medium until a pH value of the reaction medium of between 7 and 10 is obtained;
   (iv) adding silicate and acidifying agent simultaneously to the reaction medium in such a way that the pH of the reaction medium is kept between 7 and 10; and
   (v) stopping the addition of the silicate while continuing the addition of the acidifying agent to the reaction medium until a pH value of the reaction medium of less than 6 is obtained,
wherein the inorganic filler increases the rigidity of the thermoplastic polymeric material while maintaining or improving its impact resistance, and wherein the thermoplastic polymeric material comprises at least 90% by mass of:
   a homopolyolefin selected from the group consisting of a polyethylene, a polypropylene, a polybutylene, and a poly(methylpentene);
   a copolymeric polyolefin formed from at least two different members selected from the group consisting of ethylene, propylene, butylene and methylpentene units; or
   a mixture of two or more of said homopolyolefins and/or said copolymeric polyolefins, and the remainder of the material is a silica (S) and optionally one or more additives and/or inorganic fillers.

10. The method of claim 9, wherein the silica (S1) has:
   an object size distribution width Ld ((d84−d16)/d50) measured by XDC granulometry after ultrasonic deagglomeration of at least 1.04; and
   a pore volume distribution according to the pore size such that the ratio $V_{(d5-d50)}/V_{(d5-d100)}$ is at least 0.71.

11. A method for preparing a thermoplastic polymeric material, which comprises incorporating into said thermoplastic polymeric material a silica (S2) as an inorganic filler, said silica having the following features:
   a BET specific surface area of between 60 and 550 m$^2$/g;
   a CTAB specific surface area of between 40 and 525 m$^2$/g; and
   a pore distribution width ldp of more than 0.70;
said silica being obtained according to a method P comprising reacting a silicate with an acidifying agent, thereby obtaining a silica suspension, then separating and drying the suspension, wherein the reaction of the silicate with the acidifying agent is performed according to the following consecutive steps:
   (i) forming an aqueous starter having a pH of between 2 and 5;
   (ii) adding silicate and acidifying agent simultaneously to said starter in such a way that the pH of the reaction medium is kept between 2 and 5;
   (iii) stopping the addition of the acidifying agent while continuing the addition of silicate to the reaction medium until a pH value of the reaction medium of between 7 and 10 is obtained;
   (iv) adding silicate and acidifying agent simultaneously to the reaction medium in such a way that the pH of the reaction medium is kept between 7 and 10; and
   (v) stopping the addition of the silicate while continuing the addition of the acidifying agent to the reaction medium until a pH value of the reaction medium of less than 6 is obtained,
wherein the inorganic filler material increases the rigidity of the thermoplastic polymeric material while maintaining or improving its impact resistance, and wherein the thermoplastic polymeric material comprises at least 90% by mass of:
   a homopolyolefin selected from the group consisting of a polyethylene, a polypropylene, a polybutylene and a poly(methylpentene);
   a copolymeric polyolefin formed from at least two different members selected from the group consisting of ethylene, propylene, butylene and methylpentene units; or
   a mixture of two or more of said homopolyolefins and/or said copolymeric polyolefins,
and the remainder of the material is a silica (S) and optionally one or more additives and/or inorganic fillers.

12. The method of claim 11, wherein the silica (S2) has a pore distribution width ldp of more than 0.80.

13. The method of claim 11, wherein the silica (S2) further has an object size distribution width Ld ((d84−d16)/d50) measured by XDC granulometry after ultrasonic deagglomeration of at least 0.91.

14. A method for preparing a thermoplastic polymeric material, which comprises incorporating into said thermoplastic polymeric material a silica (S3) as an inorganic filler, said silica having the following features:
   a BET specific surface area of between 60 and 550 m$^2$/g;
   a CTAB specific surface area of between 40 and 525 m$^2$/g;
   an object size distribution width L'd ((d84−d16)/d50) below 500 nm measured by XDC granulometry after ultrasonic deagglomeration of at least 0.95; and
   a pore volume distribution such that the ratio $V_{(d5-d50)}/V_{(d5-d100)}$ is at least 0.71;
said silica being obtained according to a method P comprising reacting a silicate with an acidifying agent, thereby obtaining a silica suspension, then separating and drying the suspension, wherein the reaction of the silicate with the acidifying agent is performed according to the following consecutive steps:
   (i) forming an aqueous starter having a pH of between 2 and 5;
   (ii) adding silicate and acidifying agent simultaneously to said starter in such a way that the pH of the reaction medium is kept between 2 and 5;
   (iii) stopping the addition of the acidifying agent while continuing the addition of silicate to the reaction medium until a pH value of the reaction medium of between 7 and 10 is obtained;
   (iv) adding silicate and acidifying agent simultaneously to the reaction medium in such a way that the pH of the reaction medium is kept between 7 and 10; and
   (v) stopping the addition of the silicate while continuing the addition of the acidifying agent to the reaction medium until a pH value of the reaction medium of less than 6 is obtained,
wherein the inorganic filler increases the rigidity of the thermoplastic polymeric material while maintaining or improving its impact resistance, and wherein the thermoplastic polymeric material comprises at least 90% by mass of:
   a homopolyolefin selected from the group consisting of a polyethylene, a polypropylene, a polybutylene and a poly(methylpentene);
   a copolymeric polyolefin formed from at least two different members selected from the group consisting of ethylene, propylene, butylene and methylpentene units; or
   a mixture of two or more of said homopolyolefins and/or said copolymeric polyolefins,
and the remainder of the material is a silica (S) and optionally one or more additives and/or inorganic fillers.

15. The method of claim 14, wherein the silica (S3) has a ratio $V_{(d5-d50)}/V_{(d5-d100)}$ of at least 0.73.

16. A method for preparing a thermoplastic polymeric material, which comprises incorporating into said thermoplastic polymeric material a silica (S4) as an inorganic filler, having the following features:
   a BET specific surface area of between 60 and 550 m$^2$/g;
   a CTAB specific surface area of between 40 and 525 m$^2$/g;
   an object size distribution width L'd ((d84−d16)/d50) below 500 nm measured by XDC granulometry after ultrasonic deagglomeration of at least 0.90; and
   a pore volume distribution such that the ratio $V_{(d5-d50)}/V_{(d5-d100)}$ is at least 0.74,
said silica being obtained according to a method P comprising reacting a silicate with an acidifying agent, thereby obtaining a silica suspension, then separating and drying the suspension, wherein the reaction of the silicate with the acidifying agent is performed according to the following consecutive steps:
   (i) forming an aqueous starter having a pH of between 2 and 5;
   (ii) adding silicate and acidifying agent simultaneously to said starter in such a way that the pH of the reaction medium is kept between 2 and 5;
   (iii) stopping the addition of the acidifying agent while continuing the addition of silicate to the reaction medium until a pH value of the reaction medium of between 7 and 10 is obtained;

(iv) adding silicate and acidifying agent simultaneously to the reaction medium in such a way that the pH of the reaction medium is kept between 7 and 10; and (v) stopping the addition of the silicate while continuing the addition of the acidifying agent to the reaction medium until a pH value of the reaction medium of less than 6 is obtained, wherein the inorganic filler increases the rigidity of the thermoplastic polymeric material while maintaining or improving its impact resistance, and wherein the thermoplastic polymeric material comprises at least 90% by mass of:

a homopolyolefin selected from the group consisting of a polyethylene, a polypropylene, a polybutylene and a poly(methylpentene);

a copolymeric polyolefin formed from at least two different members selected from a group consisting of ethylene, propylene, butylene and methylpentene units; or a mixture of two or more of said homopolyolefins and/or said copolymeric polyolefins, and the remainder of the material is a silica (S) and optionally one or more additives and/or inorganic fillers.

17. The method of claim 16, wherein the silica (S4) has an object size distribution width L'd((d84−d16)/d50) below 500 nm measured by XDC granulometry after ultrasonic deagglomeration of at least 0.92.

18. The method of claim 16, wherein the silica (S4) has a ratio $V_{(d5-d50)}/V_{(d5-d100)}$ of at least 0.78.

19. The method of claim 1, wherein the silica incorporated into the thermoplastic polymeric material has:

a BET specific surface area of between 70 and 350 m$^2$/g; and a CTAB specific surface area of between 60 and 330 m$^2$/g.

20. The method of claim 1, wherein the silica incorporated into the thermoplastic polymeric material has:

a BET specific surface area of between 60 and 400 m$^2$/g; and a CTAB specific surface area of between 40 and 380 m$^2$/g.

21. A method for preparing a thermoplastic polymeric material, which comprises incorporating into said thermoplastic polymeric material a silica ($S_0$) as an inorganic filler, having a BET specific surface area of at least 60 m$^2$/g, said silica being present in the thermoplastic polymeric material obtained substantially in the form of dispersed objects having a size of less than 5 microns, said silica being obtained according to a method P comprising reacting a silicate with an acidifying agent, thereby obtaining a silica suspension, then separating and drying the suspension, wherein the reaction of the silicate with the acidifying agent is performed according to the following consecutive steps:

(i) forming an aqueous starter having a pH of between 2 and 5;

(ii) adding silicate and acidifying agent simultaneously to said starter in such a way that the pH of the reaction medium is kept between 2 and 5;

(iii) stopping the addition of the acidifying agent while continuing the addition of silicate to the reaction medium until a pH value of the reaction medium of between 7 and 10 is obtained;

(iv) adding silicate and acidifying agent simultaneously to the reaction medium in such a way that the pH of the reaction medium is kept between 7 and 10; and (v) stopping the addition of the silicate while continuing the addition of the acidifying agent to the reaction medium until a pH value of the reaction medium of less than 6 is obtained, wherein the inorganic filler increases the rigidity of the thermoplastic polymeric material, while maintaining or improving its impact resistance, and wherein the thermoplastic polymeric material comprises at least 90% by mass of:

a homopolyolefin selected from the group consisting of a polyethylene, a polypropylene, a polybutylene and a poly(methylpentene);

a copolymeric polyolefin formed from at least two different members selected from the group consisting of ethylene, propylene, butylene and methylpentene units; or a mixture of two or more of said homopolyolefins and/or said copolymeric polyolefins, and the remainder of the material is a silica (S) and optionally one or more additives and/or inorganic fillers.

22. The method of claim 11, wherein the silica ($S_0$) is a silica (S1), having the following features:

a BET specific surface area of between 60 and 550 m$^2$/g;

a CTAB specific surface area of between 40 and 525 m$^2$/g;

an object size distribution width Ld((d84−d16)/d50) measured by XDC granulometry after ultrasonic deagglomeration of at least 0.91; and a pore volume distribution such that the ratio $V_{(d5-d50)}/V_{(d5-d100)}$ is at least 0.66.

23. The method of claim 21, wherein the silica ($S_0$) is a silica (S1) having:

an object size distribution width Ld((d84−d16)/d50) measured by XDC granulometry after ultrasonic deagglomeration of at least 1.04; and a pore volume distribution such that the ratio $V_{(d5-d50)}/V_{(d5-d100)}$ is at least 0.71.

24. The method of claim 21, wherein the silica ($S_0$) is a silica (S2) having the following features:

a BET specific surface area of between 60 and 550 m$^2$/g;

a CTAB specific surface area of between 40 and 525 m$^2$/g; and a pore volume distribution width ldp of more than 0.70.

25. The method of claim 21, wherein the silica ($S_0$) is a silica (S3) having the following features:

a BET specific surface area of between 60 and 550 m$^2$/g;

a CTAB specific surface area of between 40 and 525 m$^2$/g;

an object size distribution width L'd((d84−d16)/d50) below 500 nm measured by XDC granulometry after ultrasonic deagglomeration of at least 0.95; and a pore volume distribution such that the ratio $V_{(d5-d50)}/V_{(d5-d100)}$ is at least 0.71.

26. The method of claim 21, wherein the silica ($S_0$) is a silica (S4) having the following features:

a BET specific surface area of between 60 and 550 m$^2$/g;

a CTAB specific surface area of between 40 and 525 m$^2$/g;

an object size distribution width L'd((d84−d16)/50) below 500 nm measured by XDC granulometry after ultrasonic deagglomeration of at least 0.90; and a pore volume distribution such that the ratio $V_{(d5-d50)}/V_{(d5-d100)}$ is at least 0.74.

27. The method of claim 21, wherein the silica ($S_0$) has a BET specific surface area of between 60 and 300 m$^2$/g.

28. The method of claim 21, wherein the silica ($S_0$) is present in the thermoplastic polymeric material thus obtained in the form of aggregates, agglomerates and/or particles of which at least 90% in number have dimensions of less than 1 micron, the rest of the particles having dimensions of less than 10 microns.

29. The method of claim 21, wherein the silica ($S_0$) is dispersed in the thermoplastic polymeric material thus obtained the form of objects of which at least 80% in number have dimensions of between 30 nm and 1000 nm.

30. The method of claim 29, wherein the inorganic filler increases the rigidity of the thermoplastic polymeric material while improving its impact resistance.

31. The method of claim 21, wherein the ratio $FS_{5\,\mu m}/FV$ of the surface fraction ($FS_{5\,\mu m}$) of the volume occupied by the objects having a size of more than 5 μm on scanning electron microscope slides taken on a plurality of plane sections of non-elastomeric thermoplastic polymeric material obtained by ultracryotomy, relative to the volume fraction (FV) of silica in the non-elastomeric thermoplastic polymeric material, is below or equal to 4.

32. The method of claim 1, wherein the silica (S) has a BET specific surface area of between 60 and 300 m$^2$/g.

33. The method of claim 1, wherein the silica (S) is in powder form.

34. The method of claim 1, wherein the silica is introduced into the thermoplastic polymeric material at a content of between 0.5% and 10% by mass, relative to the total mass of the thermoplastic polymeric material including the silica.

35. The method of claim 1, wherein the thermoplastic polymeric material comprises at least 90% by mass of polypropylene or a copolymer of propylene and ethylene.

36. A thermoplastic polymeric material, prepared in accordance with the process of claim 1, having improved impact resistance.

37. The method of claim 1, wherein the thermoplastic polymeric material comprises at least 90% by mass of polypropylene.

38. The method of claim 9, wherein the thermoplastic polymeric material comprises at least 90% by mass of polypropylene.

39. The method of claim 11, wherein the thermoplastic polymeric material comprises at least 90% by mass of polypropylene.

40. The method of claim 14, wherein the thermoplastic polymeric material comprises at least 90% by mass of polypropylene.

41. The method of claim 16, wherein the thermoplastic polymeric material comprises at least 90% by weight of polypropylene.

42. The method of claim 21, wherein the thermoplastic polymeric material comprises at least 90% by weight of polypropylene.

43. A method for preparing a thermoplastic polymeric material comprising at least 90% by mass of a homopolyolefin selected from the group consisting of a polyethylene, a polypropylene, a polybutylene and a poly(methylpentene), said method comprising incorporating into said thermoplastic polymeric material a silica (S) as an inorganic filler, said silica having a BET specific surface area of at least 60 m$^2$/g, and which is obtained according to a method (P) comprising reacting a silicate with an acidifying agent, thereby obtaining a silica suspension, then separating and drying the suspension, wherein the reaction of the silicate with the acidifying agent is performed according to the following consecutive steps:
  (i) forming an aqueous starter having a pH of between 2 and 5;
  (ii) adding silicate and acidifying agent simultaneously to said starter in such a way that the pH of the reaction medium is kept between 2 and 5;
  (iii) stopping the addition of the acidifying agent while continuing the addition of silicate to the reaction medium until a pH value of the reaction medium of between 7 and 10 is obtained;
  (iv) adding silicate and acidifying agent simultaneously to the reaction medium in such a way that the pH of the reaction medium is kept between 7 and 10; and
  (v) stopping the addition of the silicate while continuing the addition of the acidifying agent to the reaction medium until a pH value of the reaction medium of less than 6 is obtained,
wherein the inorganic filler increases the rigidity of the thermoplastic polymeric material, while maintaining or improving its impact resistance.

44. The method of claim 43, wherein said silica (S) is selected from the group consisting of:
  silica (S1), which has the following properties:
    a BET specific surface area of between 60 and 550 m$^2$/g;
    a CTAB specific surface area of between 40 and 525 m$^2$/g;
    an object size distribution width Ld measured by XDC granulometry after ultrasonic deagglomeration of at least 0.91; and
    a pore volume distribution such that the ratio $V_{(d5-d50)}/V_{(d5-d100)}$ is at least 0.66;
  silica (S2), which has the following properties:
    a BET specific surface area of between 60 and 550 m$^2$/g;
    a CTAB specific surface area of between 40 and 525 m$^2$/g; and
    a pore distribution width ldp of more than 0.70;
  silica (S3), which has the following properties:
    a BET specific surface area of between 60 and 550 m$^2$/g;
    a CTAB specific surface area of between 40 and 525 m$^2$/g;
    an object size distribution width L'd ((d84−d16)/d50) below 500 nm measured by XDC granulometry after ultrasonic deagglomeration of at least 0.95; and
    a pore volume distribution such that the ratio $V_{(d5-d50)}/V_{(d5-d100)}$ is at least 0.71; and
  silica (S4), which has the following properties:
    a BET specific surface area of between 60 and 550 m$^2$/g;
    a CTAB specific surface area of between 40 and 525 m$^2$/g;
    an object size distribution width L'd ((d84−d16)/d50) below 500 nm, measured by XDC granulometry after ultrasonic deagglomeration of at least 0.90; and
    a pore volume distribution such that the ratio $V_{(d5-d50)}/V_{(d5-d100)}$ is at least 0.74.

45. A method for preparing a thermoplastic polymeric material, which comprises incorporating into said thermoplastic polymeric material a silica (S) as an inorganic filler, said silica having a BET specific surface area of at least 60 m$^2$/g, and which is obtained according to a method (P) comprising reacting a silicate with an acidifying agent, thereby obtaining a silica suspension, then separating and drying the suspension, wherein the reaction of the silicate with the acidifying agent is performed according to the following consecutive steps:
  (i) forming an aqueous starter having a pH of between 2 and 5;
  (ii) adding silicate and acidifying agent simultaneously to said starter in such a way that the pH of the reaction medium is kept between 2 and 5;
  (iii) stopping the addition of the acidifying agent while continuing the addition of silicate to the reaction medium until a pH value of the reaction medium of between 7 and 10 is obtained;
  (iv) adding silicate and acidifying agent simultaneously to the reaction medium in such a way that the pH of the reaction medium is kept between 7 and 10; and (v) stopping the addition of the silicate while continuing the addition of the acidifying agent to the reaction medium until a pH value of the reaction medium of less than 6 is obtained, wherein the inorganic filler increases the rigidity of the thermoplastic polymeric material while maintaining or improving its impact resistance, and wherein the thermoplastic polymeric material comprises at least 90% by mass of:

a homopolyolefin selected from the group consisting of a polyethylene, a polypropylene, a polybutylene and a poly(methylpentene);

a copolymeric polyolefin formed from at least two different members selected from the group consisting of ethylene, propylene, butylene and methylpentene units; or a mixture of two or more of said homopolyolefins and/or said copolymeric polyolefins, where said homopolyolefin, said copolymeric polyolefin, or said mixture of two or more of said homopolyolefins and/or said copolymeric polyolefins are the only polymeric materials in said composition.

* * * * *